United States Patent
Parison

(10) Patent No.: US 9,846,425 B2
(45) Date of Patent: Dec. 19, 2017

(54) RETRIEVING PRE-DETERMINED CONTROLLER PARAMETERS TO ISOLATE VIBRATIONS IN AN AUTHORIZED PAYLOAD

(71) Applicant: Bose Corporation, Framingham, MA (US)

(72) Inventor: James A. Parison, New Ipswich, NH (US)

(73) Assignee: Bose Corporation, Framingham, MA (US)

( * ) Notice: Subject to any disclaimer, the term of this patent is extended or adjusted under 35 U.S.C. 154(b) by 358 days.

(21) Appl. No.: 14/674,446

(22) Filed: Mar. 31, 2015

(65) Prior Publication Data

US 2016/0291574 A1    Oct. 6, 2016

(51) Int. Cl.
| | | |
|---|---|---|
| *G05B 13/00* | (2006.01) | |
| *G05D 3/00* | (2006.01) | |
| *G05B 19/406* | (2006.01) | |
| *B60N 2/50* | (2006.01) | |
| *B60N 2/52* | (2006.01) | |
| *B60N 2/02* | (2006.01) | |

(52) U.S. Cl.
CPC ........... *G05B 19/406* (2013.01); *B60N 2/501* (2013.01); *B60N 2/522* (2013.01); *B60N 2002/0272* (2013.01); *G05B 2219/39199* (2013.01)

(58) Field of Classification Search
CPC .................................................. G05B 15/02
USPC .......................................................... 700/275
See application file for complete search history.

(56) References Cited

U.S. PATENT DOCUMENTS

| | | |
|---|---|---|
| 3,606,233 A | 9/1971 | Scharton et al. |
| 5,027,302 A | 9/1971 | Scharton et al. |
| 5,432,700 A | 7/1995 | Hrovat et al. |
| 5,536,059 A | 7/1996 | Amirouche |
| 5,652,704 A | 7/1997 | Catanzarite |
| 5,796,849 A | 8/1998 | Coleman et al. |

(Continued)

FOREIGN PATENT DOCUMENTS

| | | |
|---|---|---|
| DE | 43 39 674 | 11/1993 |
| DE | 43 39 674 | 6/1995 |

(Continued)

OTHER PUBLICATIONS

Parison; "The Bose Ride™ System"; Jan. 27, 2010; http://www.bose.com/bose_ride_system_; Bose 32 pages.

(Continued)

*Primary Examiner* — Suresh Suryawanshi
(74) *Attorney, Agent, or Firm* — Fish & Richardson P.C.

(57) ABSTRACT

A method performed by one or more processing devices for ensuring that a vehicle seat top is qualified for use with a seat base for a vehicle seat, the method comprising: receiving information that identifies a type of vehicle seat top for coupling to the seat base; verifying that the vehicle seat top is authorized for use with the seat base; and in response to verifying, retrieving, based on the received information that identifies the type of vehicle seat top, pre-determined values of controller parameters of a closed loop control system for isolating vibrations from the vehicle seat top, wherein the predetermined values of the controller parameters are specifically tuned for the vehicle seat top.

29 Claims, 5 Drawing Sheets

(56) References Cited

U.S. PATENT DOCUMENTS

| | | | |
|---|---|---|---|
| 5,851,026 A * | 12/1998 | Schoos | B60N 2/002 280/732 |
| 7,665,708 B2 | 2/2010 | Stothers et al. | |
| 7,796,021 B2 * | 9/2010 | Saban | B60N 2/002 340/438 |
| 7,818,109 B2 * | 10/2010 | Scully | B60N 2/42727 180/287 |
| 7,983,813 B2 * | 7/2011 | Ummethala | B60N 2/501 267/136 |
| 8,112,198 B2 | 2/2012 | Paris on, Jr. et al. | |
| 8,120,302 B2 | 2/2012 | Zhang et al. | |
| 8,466,639 B2 * | 6/2013 | Parison, Jr. | B60N 2/0232 318/244 |
| 9,291,300 B2 * | 3/2016 | Parker | F16M 13/02 |
| 9,528,567 B2 * | 12/2016 | Robbins | F16F 15/022 |
| 2003/0066702 A1 * | 4/2003 | Jung | B60N 2/002 180/271 |
| 2006/0237885 A1 | 10/2006 | Paillard et al. | |
| 2009/0027188 A1 * | 1/2009 | Saban | B60N 2/002 340/521 |
| 2010/0332079 A1 | 12/2010 | Wang et al. | |
| 2013/0257339 A1 | 10/2013 | Kim | |
| 2014/0263932 A1 * | 9/2014 | Schroeder | F16F 7/1022 248/610 |

FOREIGN PATENT DOCUMENTS

| | | |
|---|---|---|
| EP | 0 412 853 | 3/1997 |
| EP | 1 852 302 | 11/2007 |

OTHER PUBLICATIONS

International Search Report and Written Opinion; PCT/US2016/024758; Jul. 8, 2016; 14 pages.

U.S. Appl. No. 14/231,566, filed May 10, 2014, Knox.

* cited by examiner

RETRIEVING PRE-DETERMINED CONTROLLER PARAMETERS TO ISOLATE VIBRATIONS IN AN AUTHORIZED PAYLOAD

BACKGROUND

A vehicle moving in a particular direction experiences undesired motion in other directions, as well as vibrations. These undesired motions and vibrations are uncomfortable and can cause a driver to lose control of the vehicle.

SUMMARY

In one implementation, a method performed by one or more processing devices for ensuring that a payload is qualified for use with a vibration isolation base in a system includes receiving information that identifies a type of payload for coupling to the vibration isolation base; verifying that the payload is authorized for use with the vibration isolation base; and in response to verifying, retrieving, based on the received information that identifies the type of payload, pre-determined values of controller parameters of a closed loop control system for isolating vibrations from the payload, wherein the pre-determined values of the controller parameters remain constant or vary within a predefined range during a particular operational mode of the vibration isolation base with the payload, and wherein the predetermined values of the controller parameters are specifically tuned for the payload. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. The feature of verifying that the payload is authorized for use with the vibration isolation base includes: accessing, from a data repository, information indicative of authorized payloads; and determining a correspondence between information indicative of one of the authorized payloads and the received information. Retrieving includes: retrieving, from memory in the payload or in the vibration isolation base, the pre-determined values of the controller parameters. Retrieving includes: retrieving, from a data repository, the pre-determined values of controller parameters, with the pre-determined values being mapped in the data repository to the information that identifies the type of payload. A plant includes the payload and the vibration isolation base, wherein the plant is a seat in a vehicle, and wherein the payload includes a seat top of the seat in the vehicle. At least one of the controller parameters is a parameter for setting a feedback gain as a function of a frequency in the closed loop control system. The actions include determining if the closed loop control system is stable in a plurality of different operating conditions associated with the authorized payload; wherein the controller parameters are selected such that the closed loop control system is stable under all operating conditions associated with the authorized payload. The operating conditions include the payload being tilted, the payload moving forward and backward, the payload being operated over a positional adjustment range, and the payload being stable over an entire range of driver weights. The plurality of different operating conditions are based on one or more of a mass of a driver, adjustment of a position of the payload, and an amount of inertia of the payload. The one or more processing devices include a seat base controller, and wherein the closed loop control system includes the seat base controller and the payload. The values of the controller parameters are not adaptively modified during operation of the system. The actions include performing system identification by: measuring a transfer function of the payload; comparing the measured transfer function to a plurality of stored transfer functions for the payload; determining, based on comparing, a stored transfer function that substantially matches the measured transfer function; and confirming, based on the determined match, that the payload is an authorized payload. A controller is programmed with information specifying normal signal ranges that represent normal system states, and wherein the method further includes: detecting, in the controller, an abnormal operating system state, when signals are received that are outside the normal signal ranges; and operating the controller in a passive mode, until the detected abnormal operating system state clears. The actions include prior to operation of the system, identifying the authorized payload and selecting the pre-determined values of the controller parameters; applying the pre-determined values of the controller parameters to the closed loop control system; and determining, based on applying, whether the closed loop control system has adequate gain and phase margin over the closed loop control system operating bandwidth. The actions include when the closed loop control system has an inadequate gain and/or phase margin in a frequency range, adjusting a gain of closed loop control system in at least the frequency range. The actions include when the closed loop control system has an adequate gain and phase margin, enabling control of the payload.

In another implementation, a method performed by one or more processing devices for ensuring that a vehicle seat top is qualified for use with a seat base for a vehicle seat, includes: receiving information that identifies a type of vehicle seat top for coupling to the seat base; verifying that the vehicle seat top is authorized for use with the seat base; and in response to verifying, retrieving, based on the received information that identifies the type of vehicle seat top, pre-determined values of controller parameters of a closed loop control system for isolating vibrations from the vehicle seat top, wherein the predetermined values of the controller parameters are specifically tuned for the vehicle seat top. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment may include all the following features in combination. The feature of verifying that the vehicle seat top is authorized for use with the seat base includes: accessing, from a data repository, information indicative of authorized vehicle seat tops; and determining a correspondence between information indicative of one of the authorized vehicle seat tops and the received information. Retrieving includes: retrieving, from memory in the vehicle seat top or in the seat base, the pre-determined values of the controller parameters. Retrieving includes: retrieving, from a data repository, the pre-determined values of controller parameters, with the pre-determined values being mapped in the data repository to the information that identifies the type of vehicle seat top. At least one of the controller parameters is a parameter for setting a feedback gain as a function of a frequency in the closed loop control system. The actions include determining if the closed loop control system is stable in a plurality of different operating conditions associated with the authorized vehicle seat top; wherein the controller parameters are selected such that the closed loop control system is stable under all operating conditions associated with the authorized vehicle seat top. The operating conditions include the vehicle seat top being tilted, the vehicle seat top moving forward and backward, the vehicle seat top being operated over a positional adjustment range, and the vehicle seat top being stable over an entire range of driver weights. The plurality of different operating conditions are based on one or more of a mass of a driver, adjustment of a position of the vehicle seat top, and an amount of inertia of the vehicle seat top. The pre-determined values of the controller parameters remain constant or vary within a predefined range.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
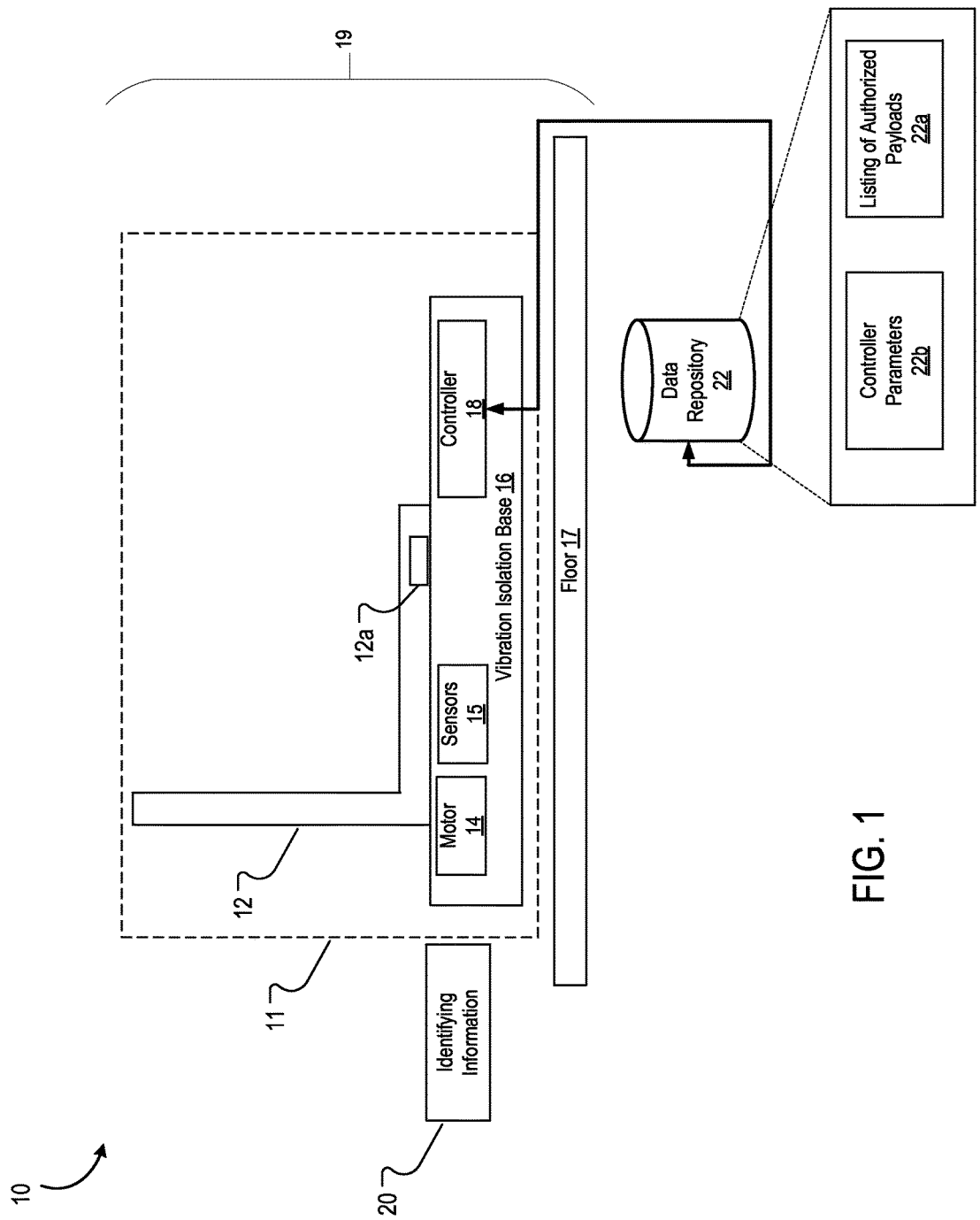
FIG. 1 is a diagram of a system for retrieving pre-determined values of controller parameters for authorized payloads.

A vibration isolation base consistent with this disclosure is coupled with a payload to isolate the payload from vibration. Generally, a vibration isolation base includes a base that provides active vibration isolation. The vibration isolation base includes an actuator, sensors, and a controller to actively reduce vibration of a portion of the base that couples to the payload from vibration of a bottom of the base (e.g., which is coupled to a structure which is vibrating). Generally, a payload is an element to be isolated by the vibration isolation base. There are various types of payloads, e.g., a seat top. In an example, a seat base of a vehicle seat is the vibration isolation base and a seat top is the payload.

In an example, the payload is part of a plant. Going forward, when we refer to the plant, we are referring to a structural element that includes the vibration isolation base and a payload that may be attached to the base. For example, the plant may be a vehicle seat that includes the vibration isolation base and a seat top coupled to the vibration isolation base.

The system is constructed and arranged to ensure that the active vibration isolation function is only enabled for an authorized or authenticated payload. In the case of a vehicle seat, the system is only active when an authorized seat top is coupled to the vibration isolation base. The system authenticates the seat top, so that the base is prevented from operating in an active mode unless an approved top is mated to it.

To ensure safe operation of the system, controller parameters for a payload (e.g., a particular seat top) are pre-determined prior to operation. Generally, a controller parameter is a coefficient of a feedback compensator filter. In an example of a new seat top, its performance on a base is determined, and controller parameters are modified as needed. That is, a controller is designed for a specific plant. The controller is designed to take into account the entire dynamics of a particular seat top. For a specific seat top, its dynamics change depending on, for example, the mass of the driver, the adjustment of seat position, etc. The seat is operated in all of its various possible normal operating conditions, and a single controller design is determined that is stable in all of those operating conditions. The parameters of this controller are loaded into system memory and downloaded into the controller, when the system determines that a corresponding (and authorized) seat top has been attached to the base.

The system stores the controller parameters in memory. The controller parameters are loaded into the controller, as needed. The memory could be in the base, in the seat top, or could be remote from the base and seat top and accessed in some manner, for example wirelessly over the Internet, where parameters are stored on a remote server or storage device.

When a seat top mates to the base, the system identifies the seat top. There are various ways in which the system does so. In an example, the seat top informs the base which top it is and appropriate controller parameters are loaded. In another example, a user could enter data into the system that specifies which seat top is being used. Other methods of communicating identifying information to the system could also be used.

The controller parameters are predetermined and do not adaptively change (e.g., beyond predetermined limits) while the seat is normally operating. In a variation, the seat top stores the controller parameters and an authentication code that identifies it to the base as an approved device. Other methods of providing controller parameters are possible.

Referring to FIG. 1, environment 10 includes plant 11, system 19 and data repository 22. System 19 includes plant 11, which in turn includes payload 12 and vibration isolation base 16. In an example, system 19 may be a vehicular system or a motion control system and payload 12 may be a seat top. System 19 includes floor 17, e.g., a floor of a vehicle.

Generally, vibration isolation base 16 includes elements needed to isolate payload 12 (e.g., a seat top) from vibration of floor 17, to which a bottom of vibration isolation base 16 is attached. That is, vibration isolation base 16 includes motor 14 (e.g., an actuator that moves payload 12), sensors 15, controller 18 and other electronics, and a support structure coupling the top and bottom of the base (e.g., scissor mechanisms are used on opposite sides of the base). The support structure constrains motion of payload 12 with respect to floor 17. This support structure also absorbs certain loads (e.g., side loads) that would otherwise be transmitted into motor 14.

In this example, controller 18 is a seat base controller and includes one or more computer systems and/or processing devices. Controller 18 outputs a control signal that isolates vibrations (e.g., in floor 17) from payload 12. The control signal is based on values of controller parameters for payload 12. As previously described, controller 18 retrieves pre-defined values of the controller parameters 22b that are specific to payload 12. In particular, the controller receives inputs from one or more of sensors 15 that provide information about vibration of various portions of system 19. Controller 18 computes a command for motor 14 to affect motion of payload 12, based on the sensor inputs, where the computation is based on the compensator filter whose parameters 22b are appropriate for the attached payload 12.

In an example, payload 12 is coupled to vibration isolation base 16. In one example, payload 12 includes memory 12a that stores identifying information 20 that identifies the type of seat top that is coupled to vibration isolation base 16. Controller 18 receives identifying information 20 and verifies that payload 12 is authorized for use with vibration isolation base 16.

There are various ways in which controller 18 verifies that payload 12 is authorized for use with vibration isolation base 16. In an example, controller 18 accesses, from data repository 22, information indicative of authorized payloads (e.g., listing 22a of authorized payloads). In this example, data repository 22 is external to plant 11. In another example, data repository 22 is integrated with plant 11. Controller 18 is configured for electronic communication with data repository 22, whether data repository 22 is internal to or external to plant 11. The accessed information indicative of authorized payloads includes listing 22a of authorized payloads (e.g., names of authorized payloads, identifiers of authorized payloads, and so forth). Controller 18 determines a correspondence (e.g., a match) between identifying information 20 for payload 12 and one of the items in listing 22a of authorized payloads. In a variation, payload 12 sends an authentication code to controller 18. The authentication code identifies payload 12 to controller 18 as an approved device. In this example, controller 18 accesses a listing of authentication codes to confirm a match. In response to verifying that payload 12 is authorized for use with vibration isolation base 16, controller 18 retrieves pre-determined values of controller parameters 22b of a closed loop control system (e.g., plant 11 and controller 18) for isolating vibrations from the payload 12. The values of controller parameters 22b are not adaptively modified (e.g., beyond predetermined limits or a predetermined range) during operation of plant 11 to promote safe operation and to reduce (or eliminate) system instability.

In an example, there is a range (e.g., a predetermined range) of control parameters that have been determined and tested to be safe (e.g., the closed negative feedback loop remains stable) under all conditions. As such, during operation controller parameters may be changed within the predetermined limits. Parameter variation such as gain scheduling (e.g., varying the gain of the feedback loop compensation filter) when used is kept within predetermined limits that have been tested with the authorized payload to ensure that the control loop remains stable under all conditions. Accordingly, either the control parameters don't change (e.g., remain constant) or they change within predefined limits that have been determined to be safe (e.g., stable) for a particular payload (e.g., seat top).

When an adaptive system is changing controller parameters based on measured variables in the system in real time, the controller parameters are going to be unpredictable. That is, the controller parameters are unknown prior to operations and change dynamically. Dynamically changing parameters increase a risk of instability. Therefore, to reduce or to eliminate this risk of system instability (and thus increase safety), the values of controller parameters 22b are not adaptively modified during operation of plant 11, or are adaptively modified within predetermined limits.

As previously described, the value of the controller parameters are pre-determined to be stable in a plurality of different operating conditions associated with payload 12, prior to operation of plant 11. There are various different types of operating conditions, including, e.g., the payload being tilted, the payload moving forward and backward, the payload being operated over a positional adjustment range, the payload varying over an expected range of driver weights, and so forth. The plurality of different operating conditions are based on a mass of a driver, adjustment of a position of the payload, an amount of inertia of the payload, and so forth.

The controller parameters 22b are coefficients of a loop filter (e.g., the feedback compensator filter previously described). The controller parameters are chosen to maximize performance (i.e., vibration reduction of the payload) provided by the closed loop control system (e.g., controller and 18 and plant 11) while ensuring the closed loop control system remains stable. Given a particular plant to be controlled, predetermined ranges of values for the loop filter coefficients can be determined that are guaranteed to provide a stable system, over the expected operating conditions of the system. In an example, controller 18 retrieves the pre-determined values of controller parameters 22b from data repository 22. In this example, the pre-determined values are mapped in data repository 22 to the information that identifies the type of payload, as shown in the below Table 1.

TABLE 1

| Controller Parameters | Payload Type |
|---|---|
| K = aa | Type I |
| K = cc | Type II |

As shown in the above Table 1, controller parameter "K" is used in generating a control signal that is input to vibration isolation base 16, which is physically coupled to payload 12. The value of controller parameter K varies, based on payload type. In this example, a first payload type (e.g., Type I) has a first predefined value of "aa" for the controller parameter K (e.g., K=aa). A second payload type (e.g., Type II) has a second predefined value of "cc" for the controller parameter K (e.g., K=cc). Using identifying information 20, controller 18 determines which payload type corresponds to the payload identified in identifying information 20. For the determined payload type, controller 18 selects the associated value of the controller parameter and uses the selected value in generating the control signal.

Controller 18 retrieves these pre-determined values of controller parameters 22b, prior to operation of plant 11. The pre-determined values of controller parameters 22b remain constant or vary within a predetermined range during a particular operational mode (e.g., a default mode, a normal mode, and so forth) of vibration isolation base 16 with payload 12. The predetermined values of the controller parameters 22b are specifically tuned for plant 11 (which includes a specific payload), as previously described. Using controller parameters 22b, controller 18 generates a control signal and transmits the control signal to vibration isolation base 16. The generated control signal attenuates or eliminates vibrations in payload 12.

In the example of FIG. 1, data repository 22 is external to system 19 in environment 10. In this example, controller 18 communicates (e.g., via the Internet or other network) with data repository 22. In a variation, memory is included in system 19, e.g., by being included in base 16 or payload 12. In this variation, memory in vibration isolation base 16 or payload 12 of plant 11 stores the pre-determined values of the controller parameters (e.g., in the mapping shown in the above Table 1). When memory in payload 12 stores the pre-determined values of the controller parameters, payload 12 sends the pre-determined values of the controller parameters to controller 18, following verification that payload 12 is authorized for use with vibration isolation base 16.

In another variation, environment 10 (and/or controller 18) includes a fault detection identification (FDI) system (not shown). The FDI system is programmed with specified normal operating system states and/or with specified abnormal operating system states. Generally, an operating system state includes information specifying instantaneous operation of the system, e.g., acceleration, position, etc. The system has knowledge of what expected normal signal ranges are, and can determine abnormal behavior when signals exceed these known ranges. Normal signal ranges correspond to normal operating system states. Signals outsides of the normal signal ranges are indicative of abnormal operating system states. In an example, the system is programmed with information specifying normal signal ranges that represent normal system states. In this example, the system detects an abnormal operating system state, when signals are received that are outside the normal signal ranges. In response, the system operates in a passive mode, until the detected abnormal operating system state clears.

In another example, if a part in plant 11 starts to fatigue or break, or a sensor starts to give incorrect readings, the FDI system determines that abnormal behavior is occurring (e.g., an abnormal operating system state) and plant 11 reverts to operating in passive mode until the fault clears. Generally, a passive mode includes a mode in which the system operates without actively generating a control signal to isolate vibrations from the payload. The FDI system is programmed with information specifying all normal operating system states (e.g., by being programmed with the normal signal ranges), to ensure that the FDI system can differentiate between normal and abnormal operating system states. Because controller parameters 22b do not dynamically change beyond predetermined limits while the system is operating in its active operating mode, a user can define what normal signals are in the system and what abnormal signals are and program the FDI system accordingly.

In the example of FIG. 1, controller 18 is physically mounted in base 16. In a variation, controller 18 can be mounted elsewhere with means of communicating (e.g., via wireless communications) with the other components of base 16 (e.g., by receiving sensor signals from base 16 and sending force commands to motor 14).

Figure 2:
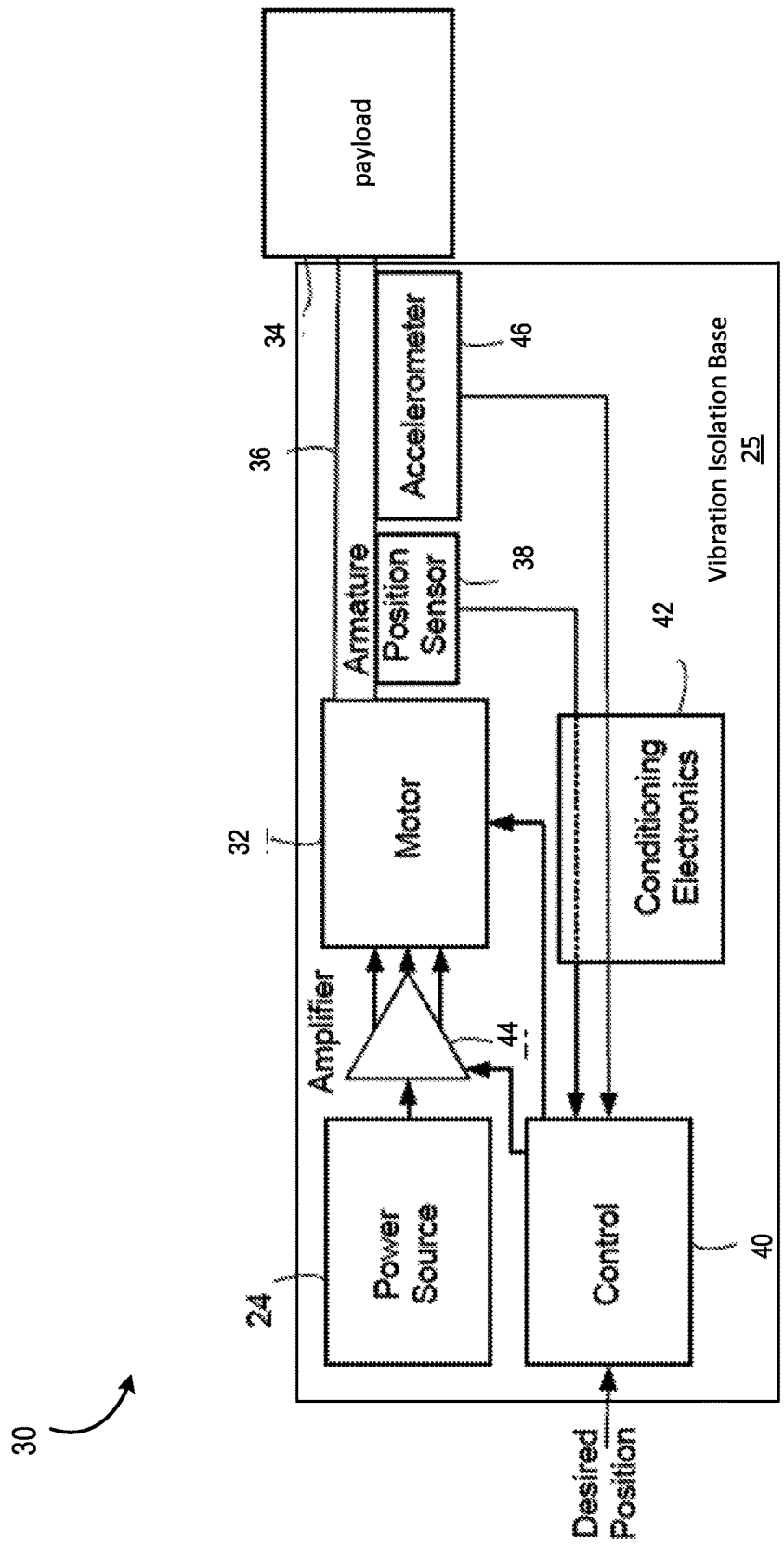
FIG. 2 is a block diagram of a motion control system.

Referring to FIG. 2, motion control system 30 includes vibration isolation base 25 and payload 34. Vibration isolation base 25 includes power source 24, motor 32, armature 36, position sensor 38, control block 40, conditioning electronics 42, amplifier 44 and accelerometer 46. Generally, motor 32 may include armature 36, although they are shown as distinct elements in FIG. 2. In this example, motion control system 30 is a closed loop control system that includes an electromechanical transducing device such as a motor 32 that imparts motion to payload 34, e.g., by applying a force to control vibration of payload 34. As previously described, a motor is part of the vibration isolation base (which is not shown in FIG. 2). Typically, the motion is imparted by applying force to payload 34 through armature 36. Alternatively, payload 34 can be rigidly connected to the stator of the motor 32, and armature 36 rigidly connected to a stationary structure. Position sensor 38 (which is also included in the vibration isolation base) is mechanically coupled to payload 34 or to an element rigidly connected to payload 34, for example in the implementation of FIG. 2, armature 36. Position sensor 38 detects the position of payload 34, and provides position information to control block 40, in some examples through conditioning electronics 42. Position sensor 38 measures the position of payload 34 relative to a non-isolated portion of base 25. In general, one part of motor 32 (a stator or armature 36) is connected to an isolated portion (e.g., payload 34) of the system and the other part of motor 32 (the other of the stator or armature 36) is connected to the non-isolated portion of the system (e.g., a portion of base 25 connected to a truck cab floor). Because of this arrangement, the position sensor can measure the position of the armature relative to the stator (which is typically what we do).

In an example, control block 40 includes controller 18 (FIG. 1). Control block 40 is coupled to motor 32 and amplifier 44 to control the distribution of current supplied by amplifier 44 and the direction and force applied by motor 32. Control block 40 receives, from position sensor 34, information specifying a position of payload 38 relative to a floor of a system. As described below, control block 40 uses this received position information to control a position of payload 34. Control block 40 also receives, from accelerometer 46, information specifying an amount of acceleration of payload. As described below, control block 40 uses this received acceleration information to control an acceleration of payload 34. Accelerometer 46 is mounted to an isolated part of vibration isolation base 25, so that vibration isolation base 25 is self-contained. Control block 40 can calibrate motion control system 30, whenever power source 24 can provide power.

Control block 40 controls acceleration of payload 34 over a large operating frequency range for a system, e.g., that includes a majority of the operating frequencies for the system. For example, the operating frequency range may be 2 Hz to 50 Hz. Control block 40 implements an acceleration loop (e.g., via a negative feedback loop) to control the acceleration over this range. Components of motion control system 30 are capable of operating at frequencies outside the normal range of operation, so that motor 32 may be able to move its armature 36 at frequencies outside the normal range of operation. For example, motor 32 may be able to respond to excitation signals of up to 1 kHz.

Controlling the position of payload 34 is important to ensure that payload 34 moves within the constraints (e.g., suspension constrains) of a system. For example, if control block 40 were to control position of payload 34 to maintain a fixed position of armature 36, relative to the stator, there would be no vibration isolation. If a floor (of a vehicular system) moved up, payload 34 would move up by the same amount in order to keep the relative position constant. However, at some point, a payload (e.g., a seat top) must follow the floor motion or vehicle suspension runs out of travel. Control block 40 also implements a position control loop. This position control loop allows payload 34 to follow the floor a limited amount. The bandwidth of this position control loop is low (e.g., up to 2 Hz) so that the higher frequency vibration is isolated from payload 34 by the acceleration control loop, but at very low frequencies the position loop controls a position of payload 34.

Based on the acceleration and position loops, controller 18 computes control signals (e.g., commands) for motor 14 to affect motion (e.g., acceleration and position) of payload 12. Control block 40 transmits the control signals to amplifier 44, motor 32, or both, to cause motor 32 to apply the desired force It is important that the position information provided by position sensor 38 to control block 40 be as accurate as possible. Offsets, drifts, or other inaccuracies, can occur due to flaws in system components, including the position sensor itself. Additional inaccuracies could result from other events or conditions, for example, mechanical misalignments or changes in magnetization of the armature due to mechanical or thermal shock. Accordingly, some method of calibrating the position sensing, processing, and transmission elements is desirable, particularly if the motion control system is designed so that one or more of the components is replaceable independently of the other components or if the motion control system is designed so that components are to be replaced in an environment (for example a vehicle maintenance facility) that may not have expensive calibration equipment.

Figure 3:
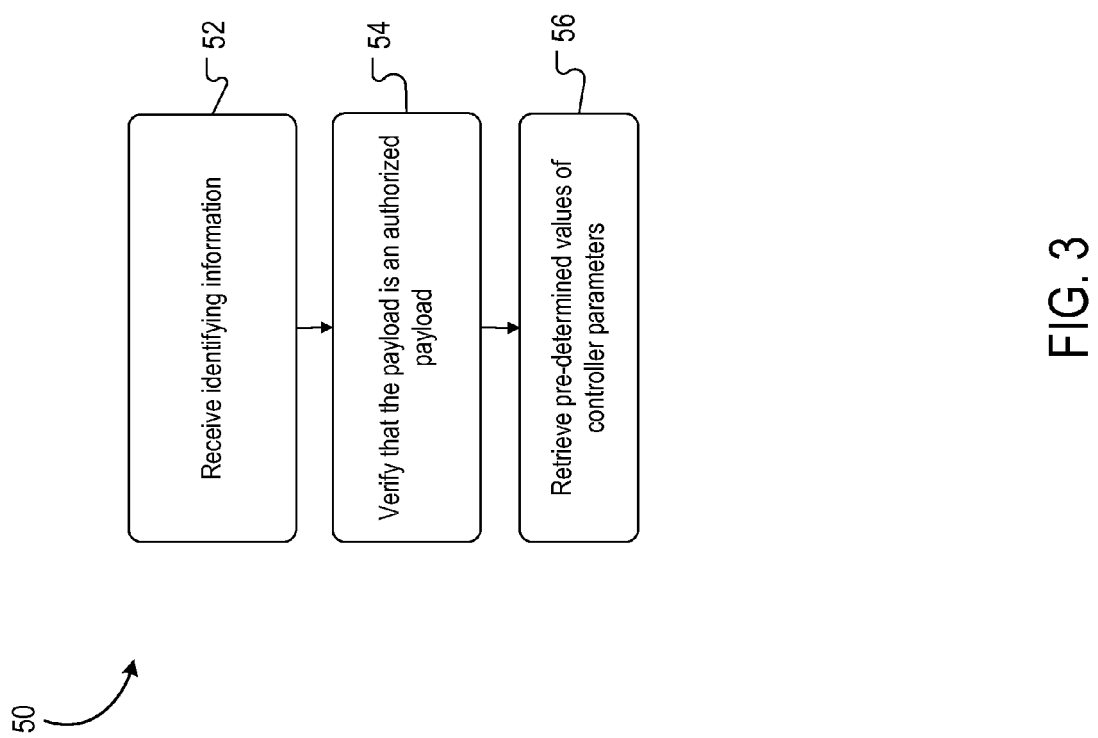
FIGS. 3 and 4 are flow diagrams of processes executed by a motion control system.

Referring to FIG. 3, controller 18 (FIG. 1) implements process 50 in determining pre-specified controller parameters for use with a payload, e.g., prior to operation of a plant. In operation, controller 18 receives (52) information that identifies a type of payload for coupling to a vibration isolation base in a plant. In an example, controller 18 receives this information from the payload. Using the information that identifies the type of payload, controller verifies (54) that the payload is authorized for use with a base (e.g., a vibration isolation base), e.g., using the techniques previously described. In response to verifying, controller 18 retrieves (56) pre-determined values of controller parameters of a closed loop control system for isolating vibrations from the payload, e.g., using the techniques previously described.

Figure 4:
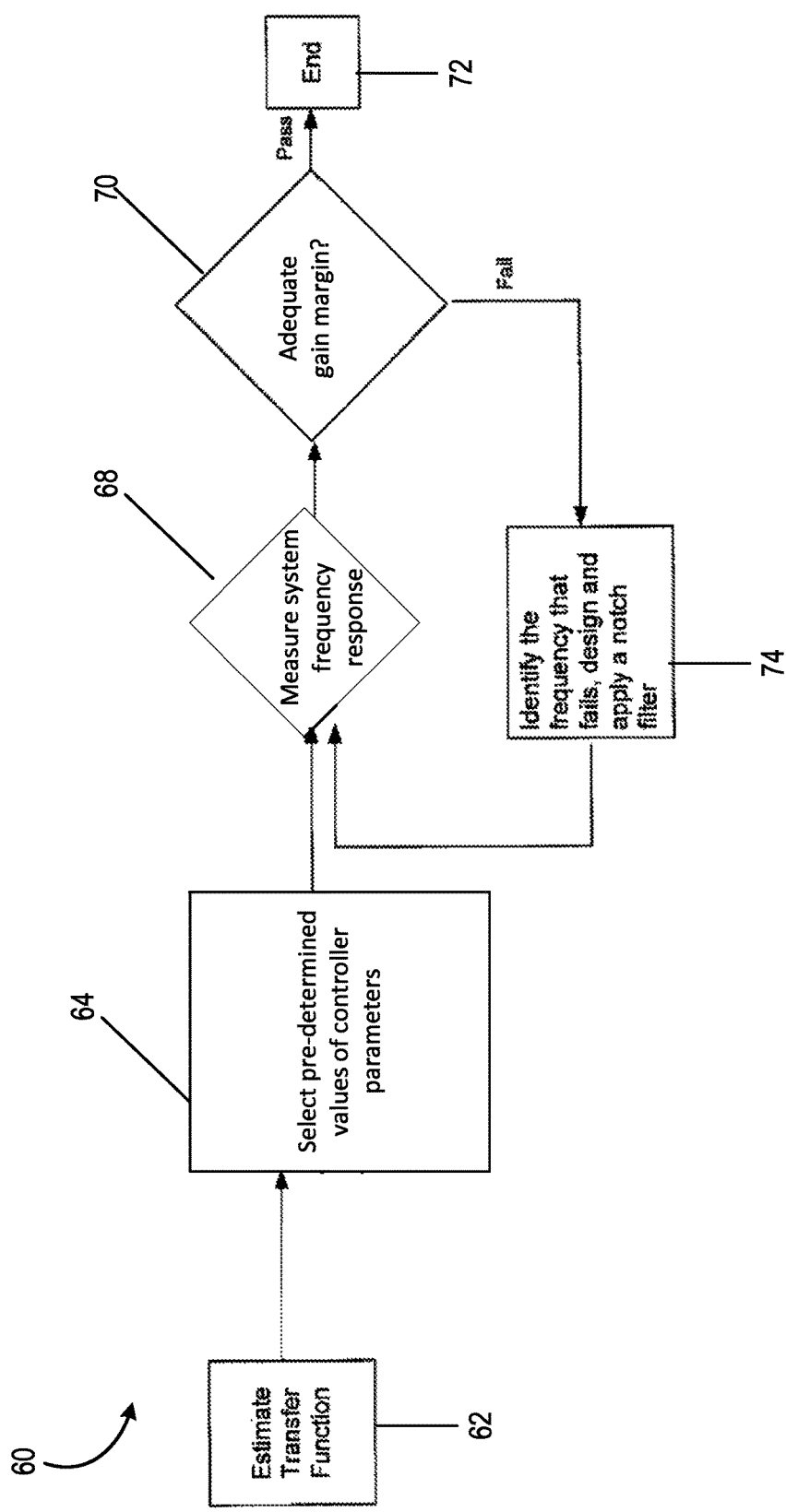

Referring to FIG. 4, controller 18 (FIG. 1) implements process 60 in performing system identification. In operation, controller 18 performs system identification on the coupled payload by estimating (62) or measuring a transfer function of the plant or of the payload. Controller 18 compares the measured transfer function to a plurality of stored transfer functions for payloads. For example, data repository 22 may store a plurality of transfer functions for various payloads. Controller 18 determines, based on comparing, a stored transfer function that substantially matches the measured transfer function. Based on the identification, controller 18 determines that the payload is authorized for use with a base.

Prior to operation of the system, controller 18 selects (64) one or more values of controller parameters that are associated with the particular, authorized payload, e.g., using the previously described techniques. Controller 18 applies the pre-determined values of the controller parameters to the closed loop control system, e.g., by transmitting parameters to the controller feedback compensator (e.g., one of the control loops). Controller 18 measures (68) the impulse response (or frequency response) of the system. Based on the measurement, controller 18 determines (70) whether the closed loop control system has adequate gain and phase margin over the closed loop control system operating bandwidth. This is a verification step to ensure the system is stable. When the closed loop control system has inadequate gain and/or phase margin in a certain frequency range, controller adjusts (74) a gain of the closed loop control system in at least the frequency range, e.g., by applying a filter, typically a notch filter, for that frequency. Controller 18 then repeats action 68 to re-measure the frequency response of the system with the notch filter active. When the closed loop control system is determined to have adequate gain and phase margin, controller enables (72) control of the payload.

In a variation, controller 18 may implement process 60 in response to determining that an unknown or unidentified payload is coupled to a base. In an example, controller 18 may make this determination based on identifying information received from the payload not matching identifying information of known, authorized payloads.

Figure 5:
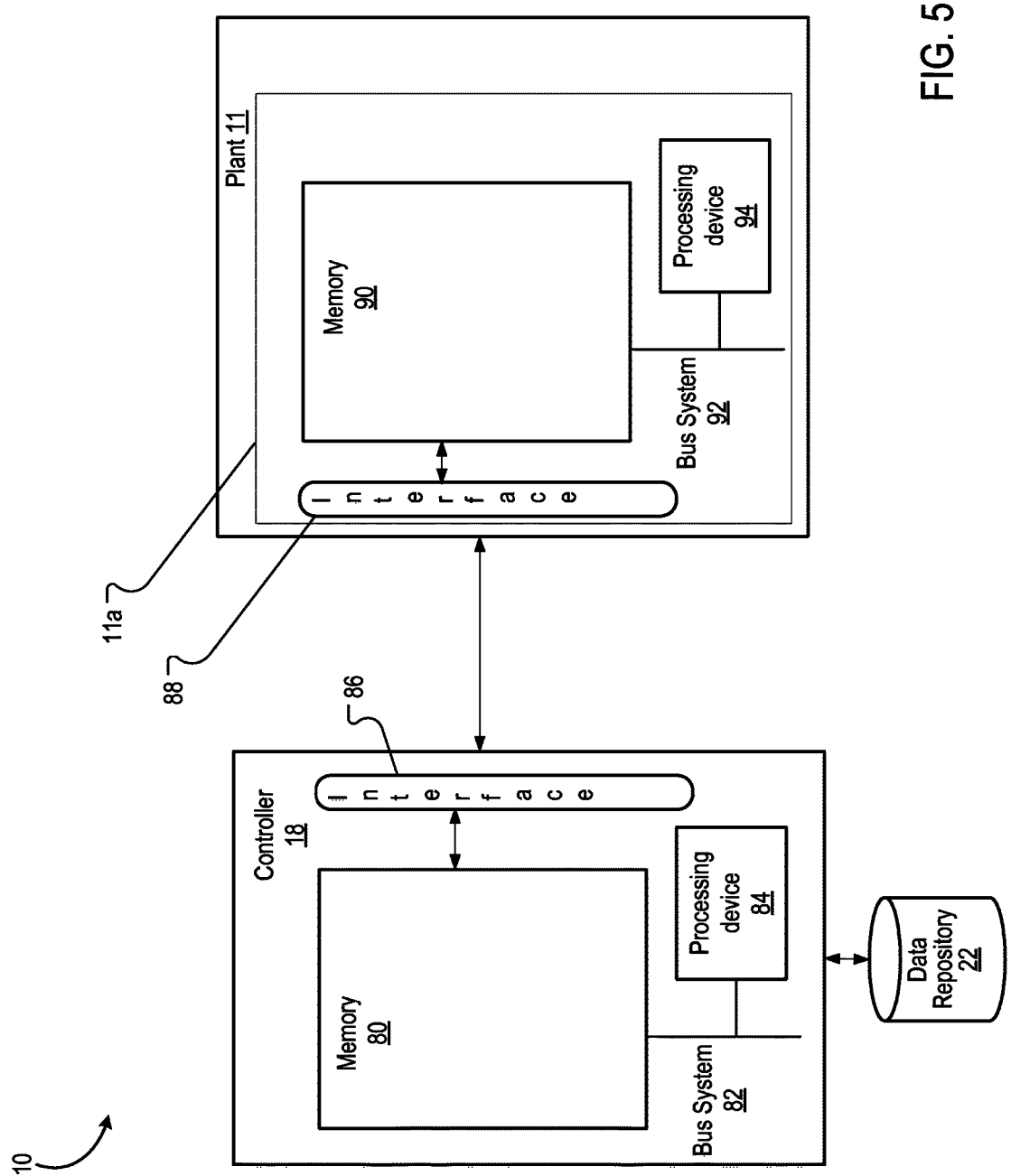
FIG. 5 is a diagram of components of the system for retrieving pre-determined values of controller parameters for authorized payloads.

Referring to FIG. 5, controller 18 also includes memory 80, a bus system 82, and a processing device 84. Memory 80 may include a hard drive or a solid state drive (SSD) or ROM, and a random access memory storage device, such as a dynamic random access memory, machine-readable media, a hardware storage device or other types of non-transitory machine-readable hardware storage devices. A bus system 82, including, for example, a data bus and a motherboard, can be used to establish and to control data communication between the components of controller 18. Processing device 84 may include one or more microprocessors and/or processing devices. Generally, processing device 84 may include any appropriate processor and/or logic that is capable of receiving and storing data, and of communicating over a network (not shown), e.g., with processing device 94 of plant 11.

Controller 18 can be any of a variety of computing devices capable of receiving data, such as a server, a distributed computing system, a desktop computer, a laptop, a cell phone, a rack-mounted server, and so forth. Controller 18 may be a single server or a group of servers that are at a same location or at different locations. Controller 18 receives data from plant 11 via input/output ("I/O") interface 86. I/O interface 86 can be any type of interface capable of receiving data over a network, such as an Ethernet interface, a wireless networking interface, a fiber-optic networking interface, a modem, and so forth.

Plant 11 includes system 11a, e.g., a computing system. System 11a includes memory 90, a bus system 92, and a processing device 94. Memory 90 can include a hard drive and a random access memory storage device, such as a dynamic random access memory, machine-readable media, a hardware storage device or other types of non-transitory machine-readable hardware storage devices. A bus system 92, including, for example, a data bus and a motherboard, can be used to establish and to control data communication between the components of controller 18. Processing device 94 may include one or more microprocessors and/or processing devices.

System 11a receives data from controller 18 (and/or from a vibration isolation base) via input/output ("I/O") interface 88. I/O interface 88 can be any type of interface capable of receiving data over a network, such as an Ethernet interface, a wireless networking interface, a fiber-optic networking interface, a modem, and so forth.

Using the techniques described herein, a vibration isolation base is coupled to numerous different seats tops. The system described herein ensures that only a qualified seat top can be coupled to the base and uses pre-determined controller parameters to generate a control signal for isolating vibrations from the seat top.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors, embedded processors, microprocessors, and other processing devices. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a."

A number of embodiments of the invention have been described. Nevertheless, it will be understood that various modifications may be made without departing from the spirit and scope of the invention.

What is claimed is:

1. A method performed by one or more processing devices for ensuring that a payload is qualified for use with a vibration isolation base in a system, the method comprising:
receiving information that identifies a type of payload for coupling to the vibration isolation base;
verifying that the payload is authorized for use with the vibration isolation base; and
in response to verifying that the payload is authorized for use with the vibration isolation base,
retrieving, based on the received information that identifies the type of payload, pre-determined values of controller parameters that include one or more filter coefficients of a closed loop control system for isolating vibrations from the payload, wherein the pre-determined values of the controller parameters remain constant or vary within a predefined range during a particular operational mode of the vibration isolation base with the payload, and wherein the pre-determined values of the controller parameters are specifically tuned for the payload such that the pre-determined values of the controller parameters are usable by the closed loop control system to reduce vibrations of the payload while satisfying a stability condition associated with the closed loop control system.

2. The method of claim 1, wherein verifying that the payload is authorized for use with the vibration isolation base comprises:
accessing, from a data repository, information indicative of authorized payloads; and
determining a correspondence between information indicative of one of the authorized payloads and the received information.

3. The method of claim 1, wherein retrieving comprises:
retrieving, from memory in the payload or in the vibration isolation base, the pre-determined values of the controller parameters.

4. The method of claim 1, wherein retrieving comprises:
retrieving, from a data repository, the pre-determined values of controller parameters, with the pre-determined values being mapped in the data repository to the information that identifies the type of payload.

5. The method of claim 1, wherein a plant comprises the payload and the vibration isolation base, wherein the plant is a seat in a vehicle, and wherein the payload comprises a seat top of the seat in the vehicle.

6. The method of claim 1, wherein at least one of the controller parameters is a parameter for setting a feedback gain as a function of a frequency in the closed loop control system.

7. The method of claim 1, further comprising:
determining if the closed loop control system is stable in a plurality of different operating conditions associated with the authorized payload;
wherein the controller parameters are selected such that the closed loop control system is stable under all operating conditions associated with the authorized payload.

8. The method of claim 7, wherein the operating conditions comprise the payload being tilted, the payload moving forward and backward, the payload being operated over a positional adjustment range, and the payload being stable over an entire range of driver weights.

9. The method of claim 7, wherein the plurality of different operating conditions are based on one or more of a mass of a driver, adjustment of a position of the payload, and an amount of inertia of the payload.

10. The method of claim 1, wherein the one or more processing devices comprise a seat base controller, and wherein the closed loop control system comprises the seat base controller and the payload.

11. The method of claim 1, wherein the values of the controller parameters are not adaptively modified during operation of the system.

12. The method of claim 1, further comprising performing system identification by:
measuring a transfer function of the payload;
comparing the measured transfer function to a plurality of stored transfer functions for the payload;
determining, based on comparing, a stored transfer function that substantially matches the measured transfer function; and
confirming, based on the determined match, that the payload is an authorized payload.

13. The method of claim 1, wherein a controller is programmed with information specifying normal signal ranges that represent normal system states, and wherein the method further comprises:

detecting, in the controller, an abnormal operating system state, when signals are received that are outside the normal signal ranges; and operating the controller in a passive mode, until the detected abnormal operating system state clears.

14. The method of claim 1, further comprising:

prior to operation of the system, identifying the authorized payload and selecting the pre-determined values of the controller parameters;

applying the pre-determined values of the controller parameters to the closed loop control system; and determining, based on applying, whether the closed loop control system has adequate gain and phase margin over the closed loop control system operating bandwidth.

15. The method of claim 14, further comprising:

when the closed loop control system has an inadequate gain and/or phase margin in a frequency range, adjusting a gain of closed loop control system in at least the frequency range.

16. The method of claim 14, further comprising:

when the closed loop control system has an adequate gain and phase margin, enabling control of the payload.

17. A method performed by one or more processing devices for ensuring that a vehicle seat top is qualified for use with a seat base for a vehicle seat, the method comprising:

receiving information that identifies a type of vehicle seat top for coupling to the seat base;

verifying that the vehicle seat top is authorized for use with the seat base; and in response to verifying that the vehicle seat top is authorized for use with the seat base, retrieving, based on the received information that identifies the type of vehicle seat top, pre-determined values of controller parameters that include one or more filter coefficients of a closed loop control system for isolating vibrations from the vehicle seat top, wherein the predetermined values of the controller parameters are specifically tuned for the vehicle seat top such that the pre-determined values of the controller parameters are usable by the closed loop control system to reduce vibrations of the vehicle seat top while satisfying a stability condition associated with the closed loop control system.

18. The method of claim 17, wherein verifying that the vehicle seat top is authorized for use with the seat base comprises:

accessing, from a data repository, information indicative of authorized vehicle seat tops; and determining a correspondence between information indicative of one of the authorized vehicle seat tops and the received information.

19. The method of claim 17, wherein retrieving comprises:

retrieving, from memory in the vehicle seat top or in the seat base, the pre-determined values of the controller parameters.

20. The method of claim 17, wherein retrieving comprises:

retrieving, from a data repository, the pre-determined values of controller parameters, with the pre-determined values being mapped in the data repository to the information that identifies the type of vehicle seat top.

21. The method of claim 17, wherein at least one of the controller parameters is a parameter for setting a feedback gain as a function of a frequency in the closed loop control system.

22. The method of claim 17, further comprising:

determining if the closed loop control system is stable in a plurality of different operating conditions associated with the authorized vehicle seat top;

wherein the controller parameters are selected such that the closed loop control system is stable under all operating conditions associated with the authorized vehicle seat top.

23. The method of claim 22, wherein the operating conditions comprise the vehicle seat top being tilted, the vehicle seat top moving forward and backward, the vehicle seat top being operated over a positional adjustment range, and the vehicle seat top being stable over an entire range of driver weights.

24. The method of claim 22, wherein the plurality of different operating conditions are based on one or more of a mass of a driver, adjustment of a position of the vehicle seat top, and an amount of inertia of the vehicle seat top.

25. The method of claim 17, wherein the pre-determined values of the controller parameters remain constant or vary within a predefined range.

26. One or more non-transitory machine-readable storage devices storing instructions that are executable by one or more processing devices to perform operations to ensure that a payload is qualified for use with a vibration isolation base in a system, the operations comprising:

receiving information that identifies a type of payload for coupling to the vibration isolation base;

verifying that the payload is authorized for use with the vibration isolation base; and in response to verifying that the payload is authorized for use with the vibration isolation base, retrieving, based on the received information that identifies the type of payload, pre-determined values of controller parameters that include one or more filter coefficients of a closed loop control system for isolating vibrations from the payload, wherein the pre-determined values of the controller parameters remain constant or vary within a predefined range during a particular operational mode of the vibration isolation base with the payload, and wherein the predetermined values of the controller parameters are specifically tuned for the payload such that the pre-determined values of the controller parameters are usable by the closed loop control system to reduce vibrations of the payload while satisfying a stability condition associated with the closed loop control system.

27. One or more non-transitory machine-readable storage devices storing instructions that are executable by one or more processing devices to perform operations to ensure that a vehicle seat top is qualified for use with a seat base for a vehicle seat, the operations comprising:

receiving information that identifies a type of vehicle seat top for coupling to the seat base;

verifying that the vehicle seat top is authorized for use with the seat base; and in response to verifying that the vehicle seat top is authorized for use with the seat base, retrieving, based on the received information that identifies the type of vehicle seat top, pre-determined values of controller parameters that include one or more filter coefficients of a closed loop control system for isolating vibrations from the vehicle seat top, wherein the predetermined values of the controller parameters are specifically tuned for the vehicle seat top such that the pre-determined values of the controller parameters are usable by the closed loop control system to reduce vibrations of the vehicle seat top while satisfying a stability condition associated with the closed loop control system.

28. A system for ensuring that a payload is qualified for use with a vibration isolation base, the system comprising:
memory storing instructions that are executable; and
one or more processing devices to execute the instructions to perform operations comprising:
receiving information that identifies a type of payload for coupling to the vibration isolation base;
verifying that the payload is authorized for use with the vibration isolation base; and
in response to verifying that the payload is authorized for use with the vibration isolation base,
retrieving, based on the received information that identifies the type of payload, pre-determined values of controller parameters that include one or more filter coefficients of a closed loop control system for isolating vibrations from the payload, wherein the pre-determined values of the controller parameters remain constant or vary within a predefined range during a particular operational mode of the vibration isolation base with the payload, and wherein the predetermined values of the controller parameters are specifically tuned for the payload such that the pre-determined values of the controller parameters are usable by the closed loop control system to reduce vibrations of the payload while satisfying a stability condition associated with the closed loop control system.

29. A system for ensuring that a vehicle seat top is qualified for use with a seat base for a vehicle seat, the system comprising:
memory storing instructions that are executable; and
one or more processing devices to execute the instructions to perform operations comprising:
receiving information that identifies a type of vehicle seat top for coupling to the seat base;
verifying that the vehicle seat top is authorized for use with the seat base; and
in response to verifying that the vehicle seat top is authorized for use with the seat base,
retrieving, based on the received information that identifies the type of vehicle seat top, pre-determined values of controller parameters that include one or more filter coefficients of a closed loop control system for isolating vibrations from the vehicle seat top, wherein the predetermined values of the controller parameters are specifically tuned for the vehicle seat top such that the pre-determined values of the controller parameters are usable by the closed loop control system to reduce vibrations of the vehicle seat top while satisfying a stability condition associated with the closed loop control system.

\* \* \* \* \*